United States Patent [19]
McVaugh

[11] Patent Number: 6,095,500
[45] Date of Patent: *Aug. 1, 2000

[54] WINCH DEVICE

[76] Inventor: Arthur K. McVaugh, Box 800, Green Lane, Pa. 18054

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/074,642

[22] Filed: May 7, 1998

Related U.S. Application Data

[63] Continuation-in-part of application No. 08/692,380, Aug. 5, 1996, abandoned.

[51] Int. Cl.[7] .............................. B66D 1/08; B66D 1/14; B66D 5/02; B65H 75/48
[52] U.S. Cl. ..................... 254/361; 254/365; 254/367; 254/375; 242/390.5; 242/394; 242/396.5
[58] Field of Search .................................. 254/361, 330, 254/365, 367, 375; 242/390.5, 390.6, 396.5

[56] References Cited

U.S. PATENT DOCUMENTS

| 191,134 | 5/1877 | Gibson et al. | 91/212 |
|---|---|---|---|
| 4,588,142 | 5/1986 | Malzacher | 242/390.5 |
| 5,238,200 | 8/1993 | Ritzenthaler | 254/330 X |

FOREIGN PATENT DOCUMENTS

| 3171 | of 1864 | United Kingdom | 91/212 |
|---|---|---|---|

*Primary Examiner*—John Q. Nguyen
*Attorney, Agent, or Firm*—John S Munday

[57] ABSTRACT

A winch device, comprising a drum for storing cable and the like, wherein the device disengageably couples the drum to a winch drum shaft driven by a high torque, low speed hydraulic motor or pump. The motor includes a housing suitable for mounting on a frame of a vehicle or other device. The principal components of the motor or pump include a crank shaft mounted in the housing for connection to a winch drum shaft. At least two cylinder and piston assemblies are attached to the crank shaft for rotation of the crank shaft upon movement of the pistons between a minimum and maximum point of travel in the cylinders to thereby impart motion to the crank shaft and, thus, the drum crank shaft. A valve assembly is driven by the crank shaft for providing hydraulic fluid to the cylinders under pressure to sequentially move each the piston between its minimum and maximum points of travel by providing hydraulic fluid under pressure on each face of the piston to move the piston in the desired direction of piston travel. The preferred coupling device is a driver block mounted on the crank shaft, a driver block receiving socket mounted on the winch drum shaft; and a unit moving one of the shafts into and out of engagement there between. A brake prevents rotation of the winch drum shaft when the shafts are out of engagement there between.

5 Claims, 9 Drawing Sheets

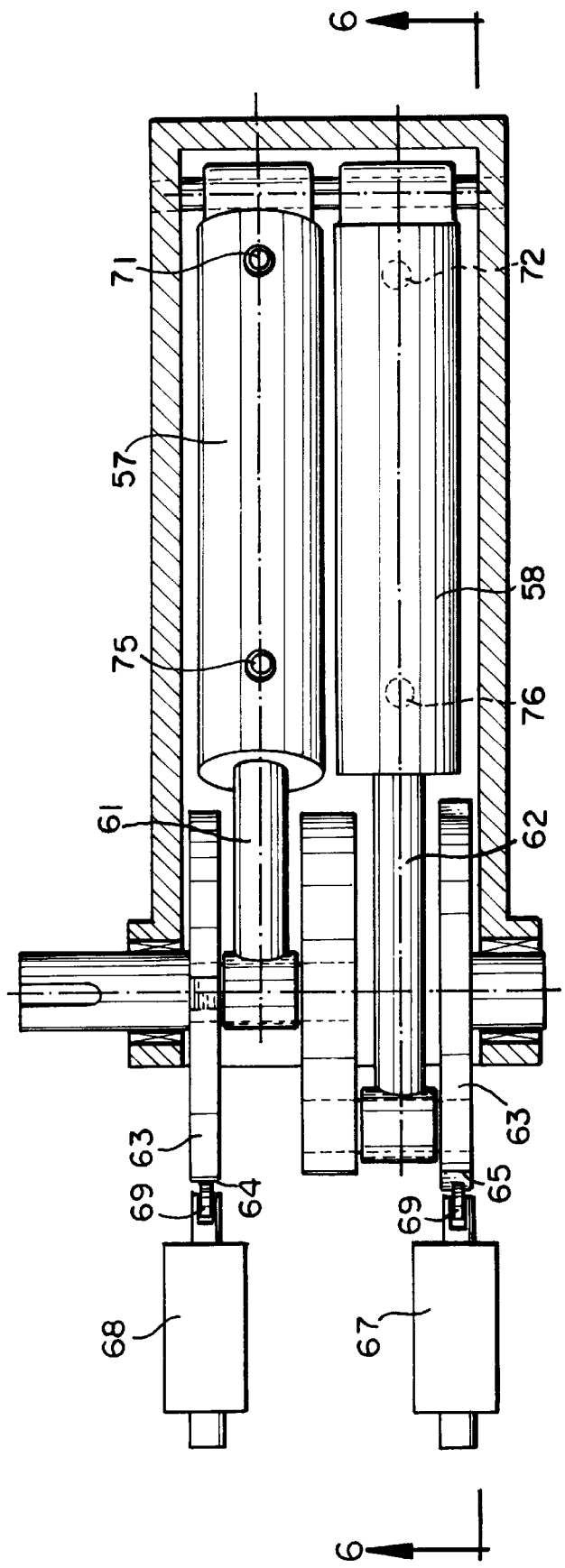

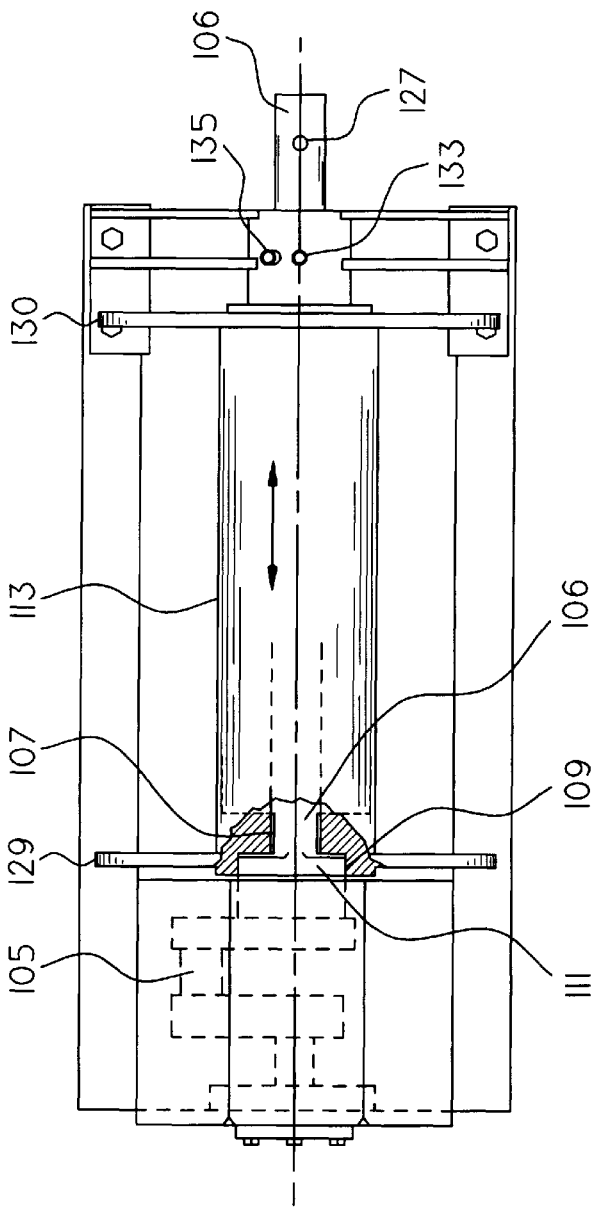
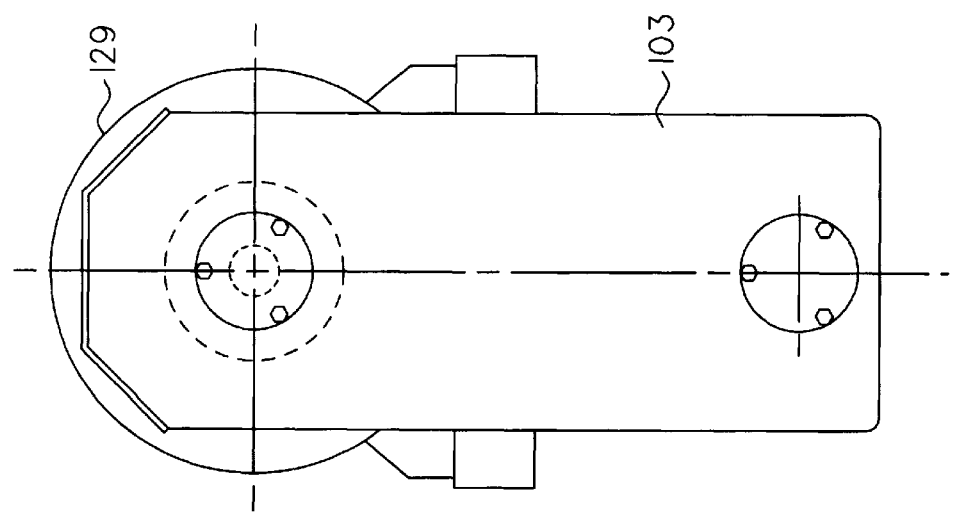
FIG. 9
FIG. 8

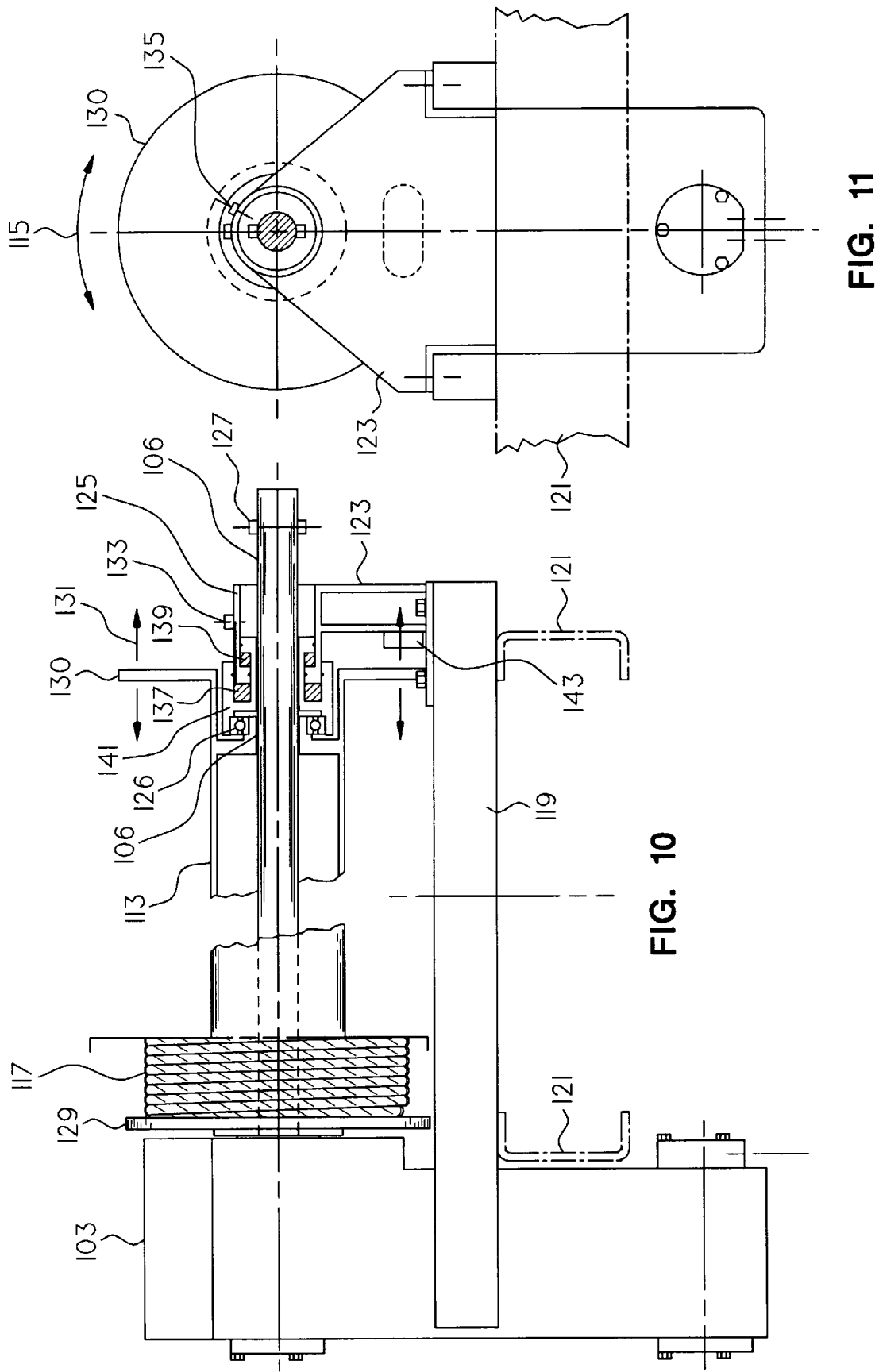

WINCH DEVICE

This is a continuation-in-part application of my application Ser. No. 08/692,380 filed Aug. 5, 1996, abandoned.

FIELD OF THE INVENTION

The present invention relates to a winch having a high torque, low speed hydraulic motor, and more particularly to a winch and motor of greatly improved power to weight design.

BACKGROUND OF THE INVENTION

Winches for pulling cable, rope, chains and the like have been employed in many situations where it is desirable to pull long lengths of cable over a long distance. In addition to the common use of winches on tow trucks and the like for pulling vehicles from off-road locations, where electric winches are adequate, the more difficult industrial applications involve cables and the like of substantial weight per unit length, such as power cables and anchor chains, for example.

A winch is, in its simplest form, a drum on which cable and the like is wound or unwound, where the drum is driven by a motor. Many winches used with heavy cables such as electric power cables employ gears and transmissions for converting shaft speed into pulling power. In these devices, higher drum speed reduces the power available to turn the shaft on which the drum resides. This results in a trade-off which is acceptable only when one or the other of the factors of speed or pulling power is in excess.

Hydraulic motors have been used in some winch applications, where a fluid under pressure is introduced into a cylinder to drive a piston and thus convert hydrostatic energy to movement, usually rotational by driving a crank shaft which in turn drives the shaft on which the drum is mounted. . In most cases the hydraulic motor is designed to drive a shaft, usually in combination with a transmission or gear box.

One form of hydraulic motor that has found use in industry is the low speed/high torque hydraulic motor, although it has not been applied to winch devices because of certain drawbacks listed below. These low speed and high torque hydraulic motors come in two basic forms and in a variety of designs. The motors either are gear reduction motors or radial piston motors. In the former, high speed motors are reduced using a complicated series of gears to lower the speed and achieve higher torque. In the latter, various schemes for moving fluids around the axis of a crankshaft have been provided. Neither is suitable for use with, for example, a compact winch design mounted on a utility company vehicle used for installing and removing heavy electric power cables and the like.

Vane motors employ pressure against a plurality of vanes riding on a ring cam to form sealed chambers that carry fluid through the device, optimally at low pressure. The major disadvantage is that there are too many leakage paths. Rolling-vane motors sequence fluid flow to put high pressure against trailing surfaces and low pressure against leading surfaces, but are limited in displacement.

There are also a variety of piston motors. Radial piston motors have a wide displacement range and are very efficient in medium or high displacement ranges. Cam type radial piston motors are less efficient and have difficulty at low speed. Axial piston motors are effective and have good starting torque characteristics. Two sources of heavy duty hydraulic motors are Nutron Motor Co., Inc. in Eliot, Maine, which produces a radial piston hydraulic motor under the MHA series, and Kawasaki Precision Machinery, Inc. which produces radial piston hydraulic motors at its Staffa facility in Plymouth, England.

One of the principle drawbacks to hydraulic motors is that the commercial designs are extremely large for the power that is produced. Both the space or volume taken up by such motors and the weight that is needed are so great as to be seen as drawbacks or handicaps when selection of a motor is being made. In order to have useful torque in industrial applications, such as in heavy equipment, moveable boat and lumber lifts, end loaders, winches, and other hub drive designs, great amounts of power is needed. However, all presently known designs are not capable of effectively using the power of a short stroke, high displacement motor arranged within a compact area or motor volume so as to be adapted to the device of interest.

It would be of great advantage if an improved hydraulic motor for use with winches could be provided that would deliver the same or greater power using less space and having less weight than conventional motors which have been described.

In addition, it would be an advance in the art if high torque, low speed motors could be designed that did not require the use of multiple reducing gears to translate high speed motion into low speed, high torque output.

Finally, it would be of significant advance if a winch device with a hydraulic motor could be provided that had the capability of self braking, so that no additional brake device would be needed for the motor, and the equipment to which it is attached, to remain motionless while supporting the full weight of the load being driven. In other words, it would be a great advance if the motor could stop at any pre-selected point and support the load attached thereto without the use of additional brake elements.

Accordingly, it is an object of the present invention to provide a winch device having a drum driven by an hydraulic motor capable of operating under high torque and low speed, such motor being suitable for operation in a smaller space than prior art designs.

A further object of this invention is to provide a winch device having a drum driven hydraulic motor capable of producing high torque and low speed without the need for multiple reducing gears to translate high speed motion into the resultant high torque and low speed.

Yet another object of the present invention is to provide a winch device having a drum driven hydraulic motor having fixed displacement of substantially larger capacity.

Other objects will appear hereinafter.

SUMMARY OF THE INVENTION

It has now been discovered that the above and other objects of the present invention may be accomplished in the following manner. Specifically, the present invention provides a winch device of reduced size and increased power, capable of operating under high torque and low speed. The winch device is suitable for operation in a smaller space than prior art designs.

The winch device of this invention includes a drum for storing cable and the like. A winch shaft drum disengageably couples the drum to a high torque, low speed hydraulic motor which drives a crank shaft attached thereto. The motor includes a housing suitable for mounting on a frame of a vehicle or other device. In a preferred embodiment, the entire winch device is mounted on a truck or other commercial vehicle for use at various locations as needed.

The principal components of the motor or pump include a crank shaft mounted in the housing for connection to a winch drum shaft. Cylinder and piston assemblies are attached to a crank shaft for rotation upon movement of the pistons in the cylinders to thereby impart motion to the crank shaft and, thus, the drum crank shaft. The preferred coupling device is a driver block mounted on the crank shaft, a driver block receiving socket mounted on the winch drum shaft; and a unit moving one of the shafts into and out of engagement there between.

A brake prevents rotation of the winch drum shaft when the shafts are out of engagement there between.

BRIEF DESCRIPTION OF THE DRAWINGS

For a more complete understanding of the invention, reference is hereby made to the drawings, in which:

FIG. 7 is a plan view of the embodiment shown in FIG. 6, with some moving parts shown in dotted line.

FIG. 8 is an end view of the preferred embodiment of the present invention, showing the end of the device having the motor attached thereto.

FIG. 9 is a plan view, partially in section, of the preferred embodiment and with some moving parts shown in dotted line.

FIG. 10 is an enlarged, side elevational view, partially in section, showing the preferred embodiment and details of the brake mechanism therein.

FIG. 11 is an end view of the preferred embodiment, from the end opposite the driving motor.

DETAILED DESCRIPTION OF THE PREFERRED EMBODIMENT

Figure 1:
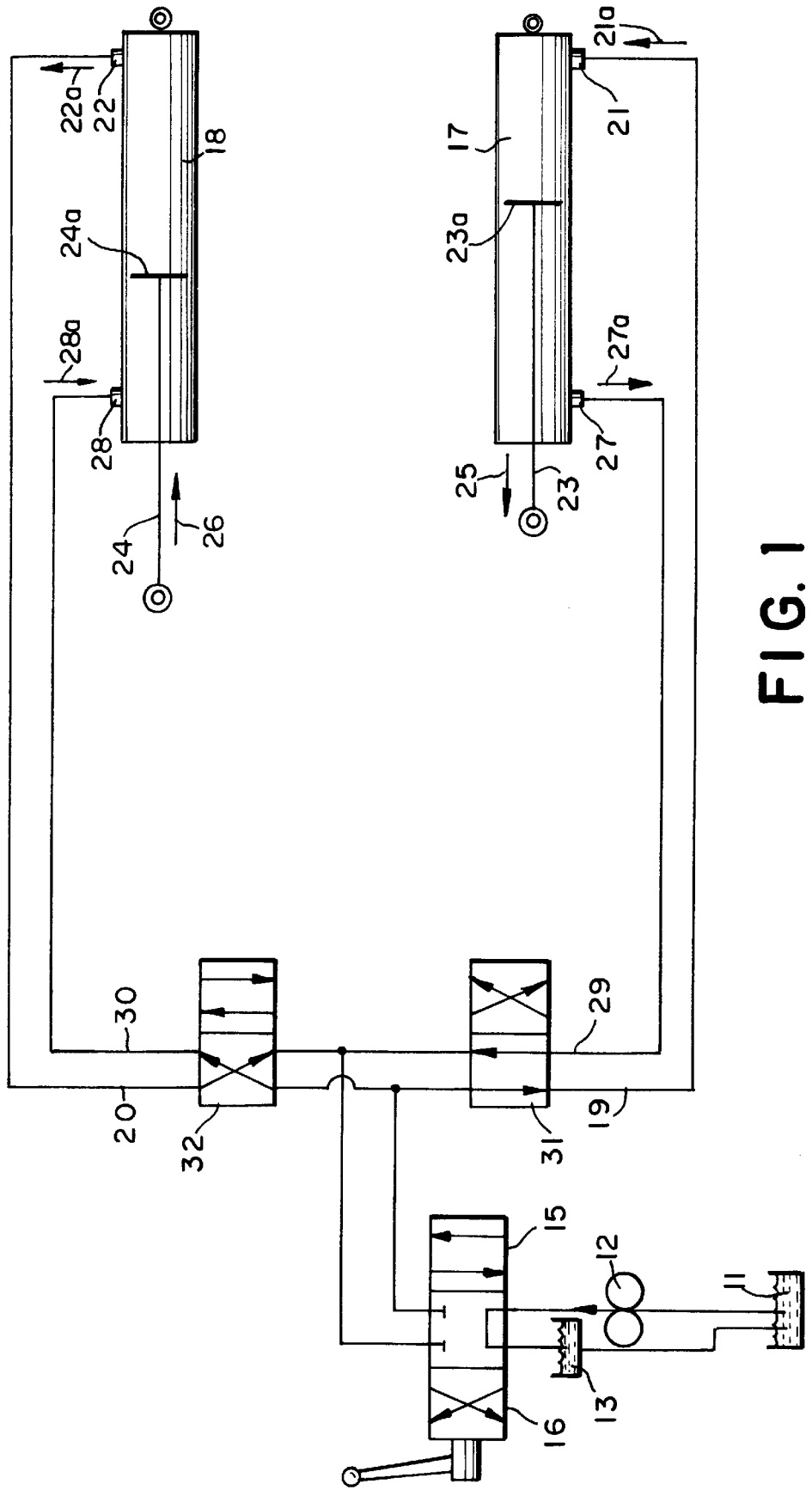
FIG. 1 is a schematic view showing the hydraulic flow system utilized in the motor used in this invention.

As shown in the drawings, the present invention provides a hydraulic motor employing dual action on a piston, so as to push as well as pull the piston with a power stroke. Shown in FIG. 1 is a schematic flow diagram illustrating the way that fluid flows into a pair of pistons to drive a shaft. The hydraulic lines route fluid in one end to push the piston to maximum position, then fluid is introduced to the other side of the piston as pressure is released on the first side so that the fluid continues to drive the piston to its minimum position with respect to the crank shaft.

Specifically shown in FIG. 1 is a source of hydraulic fluid 11 that is routed under pressure by pump 12. A return chamber 13 functions to receive the return of fluid under reduced or low pressure and return it to source 11. Valve 15 transmits high pressure hydraulic fluid from pump 12 and functions as a forward/reverse control, so that the motor operates to rotate in a first or forward direction of rotation or in a second or reverse direction of rotation.

Valves 31 and 32 serve to direct the high pressure fluid in one direction for the first cylinder 17 and in the opposite direction for second cylinder 18. High pressure hydraulic fluid flows through valve 31 via line 19 into first port 21 of cylinder 17, as shown by the inlet arrow 21a, pushing piston rod 23 in the direction of arrow 25. Hydraulic fluid exits cylinder 17 at second port 27 as shown by the outlet arrow 27a, to be returned via line 29 to return chamber 13 through valve 15. Valve 31 functions to control flow in lines 19 and 29. Fluid entering port 21 forces the piston head 23a on piston rod 23 to move in the direction of arrow 25 until it reaches its maximum point of travel.

At the same time, high pressure hydraulic fluid flows in a second direction via line 30 through valve 32 into second port 28 of cylinder 18, as shown by the inlet arrow 28a, pulling piston rod 24 in the direction of arrow 26. Hydraulic fluid exits cylinder 18 at first port 22 as shown by the outlet arrow 22a, to be returned via line 20 to return chamber 13 through valve 15. Valve 32 functions to control flow in lines and 30. Fluid entering port 28 forces the piston head 24a on piston rod 24 to move in the direction of arrow 26 until it reaches its minimum point of travel.

When valve 31 senses that piston rod 23 has reached its maximum stroke, as will be shown in several embodiments below, flow in lines 19 and 29 is reversed, so that high pressure fluid enters second port 27 in the opposite direction to arrow 27a, forcing the piston head 23a on piston rod 23 to move in the opposite direction to arrow 25. Pressure in line 19 is released by valve 31 so that low pressure fluid exits cylinder 17 via first port 21 in the direction opposite to arrow 21a. Similarly when valve 32 senses that piston rod 24 has reached its minimum stroke, as will be shown in several embodiments below, flow in lines 30 and 20 is reversed, so that high pressure fluid enters first port 22 in the opposite direction to arrow 22a, forcing the piston head 24a on piston rod 24 to move in the opposite direction to arrow 26. Pressure in line 30 is released by valve 32 so that low pressure fluid exits cylinder 18 via second port 28 in the direction opposite to arrow 28a. As can be appreciated, both cylinder 17 and cylinder 18 have what is called a null point or dead point when hydraulic pressure is switching from high to low on one side or the other of the piston head 23a, 24a, respectively. For that reason, when two pistons are used, as in FIG. 1 and elsewhere, the piston cycles are offset from each other, preferably by 90°, so that at least one piston is driving in one direction while the other piston is at null as the direction of high pressure flow reverses for that other piston.

Figure 2A:
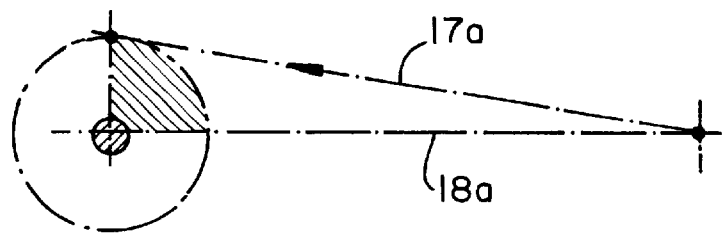
FIGS. 2a, 2b, 2c, 2d, 2e, and 2f is a schematic view illustrating a sequence of high and low pressure on both sides of a piston, with three views showing dead center, extending and retracting positions.
Figure 2B:
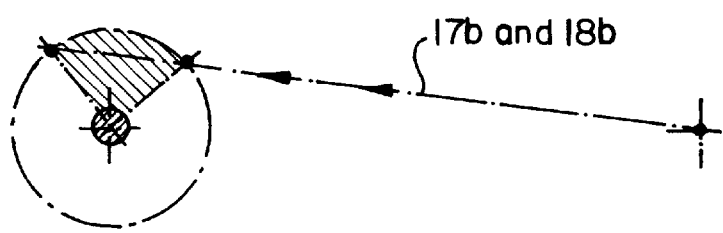
Figure 2C:
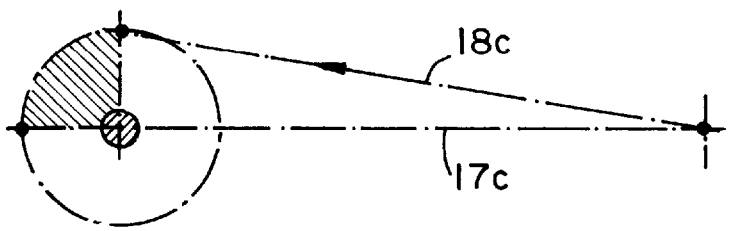
Figure 2D:
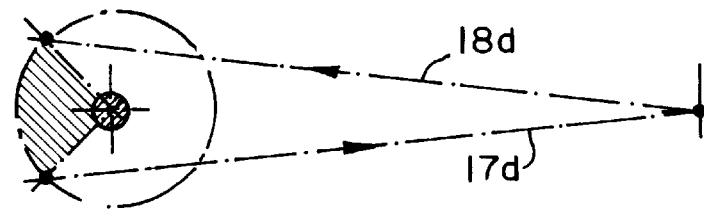
Figure 2E:
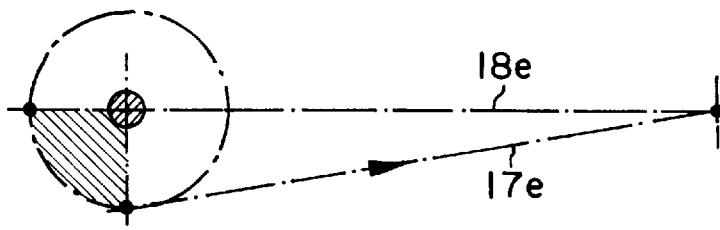
Figure 2F:
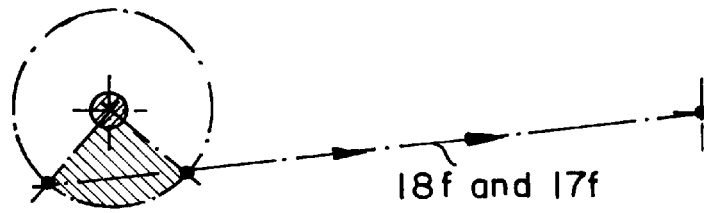

FIGS. 2a–2f illustrate the effort applied by two cylinders attached to a crankshaft through one revolution of that shaft. FIG. 2a illustrates the situation when first cylinder 17a is being pushed by high pressure hydraulic fluid (the condition of cylinder 17 shown in FIG. 1) and second cylinder 18a is on dwell, providing no effort or movement to the shaft. FIG. 2b represents the point in the cycle when both 17b and 18b are pushing on their respective piston heads 23a and 24a. FIG. 2c is the opposite of 2a, with 18c pushing and 17c on dwell or null. As the shaft rotates, FIG. 2d represents the condition when 18d is pushing while cylinder 17d is now receiving high pressure hydraulic fluid on the opposite side of the piston head (the condition of cylinder 18 shown in FIG. 1). FIG. 2e represents the next condition, where 18e is on dwell and 17e is pulling, with pressure on the rod side of its piston head. Finally, FIG. 2f illustrates the condition where both 17f and 18f are pulling, with pressure as shown for cylinder 18 of FIG. 1. This completes one revolution of the shaft to which the pistons 17, 18 are connected. As can be seen, at all times there is positive hydraulic pressure urging at least one piston to drive the shaft, even when the other piston is at dwell or not exerting power. This not only provides for smoother power transmission, it allows for the motor to always have positive displacement when starting or stopping the motor.

Figure 3:
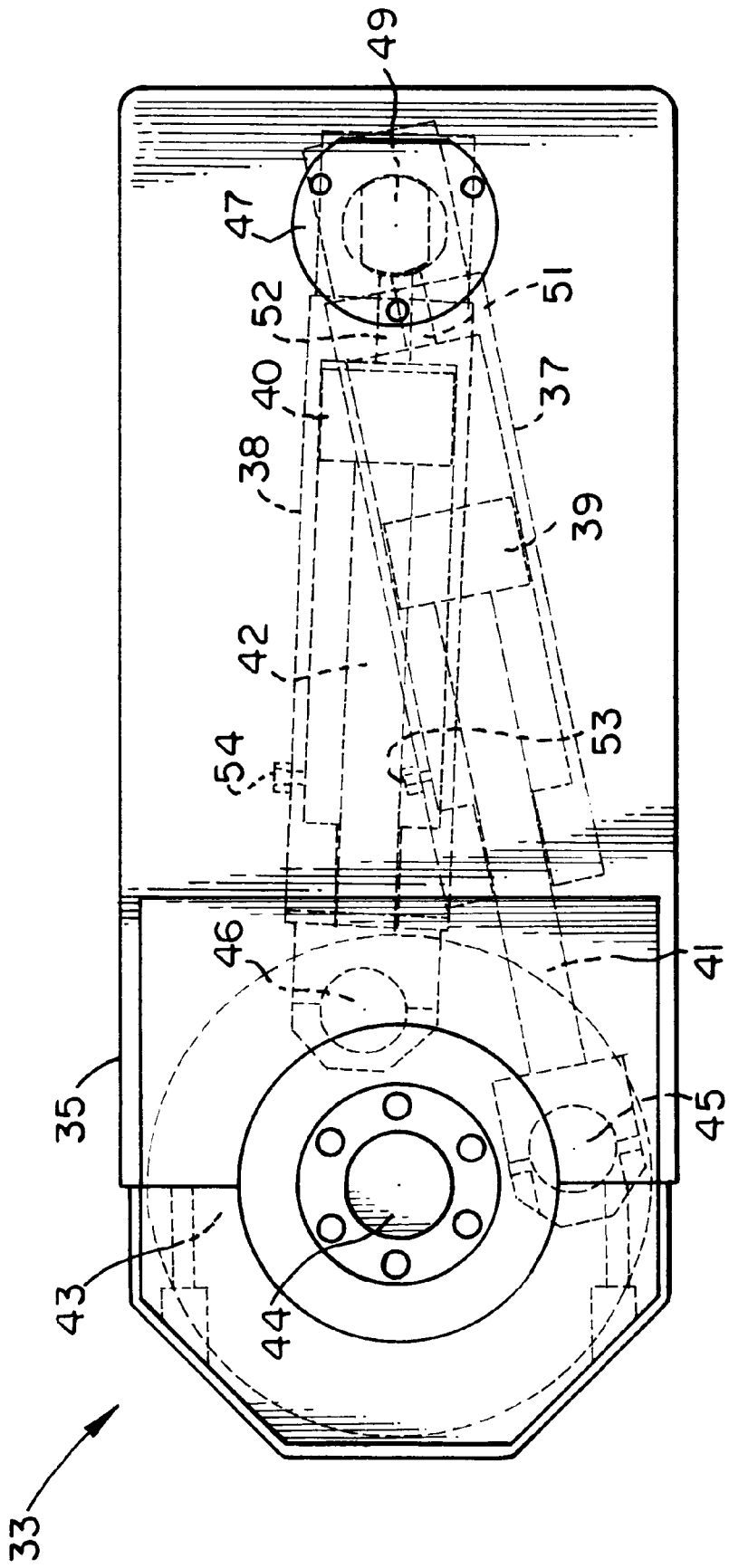
FIG. 3 is a side elevational view of the preferred embodiment of the present invention, with some moving parts shown in dotted line.

FIG. 3 illustrates the preferred embodiment of the present invention, where the motor 33 generally is enclosed in a housing 35. Cylinders 37 and 38 operate as illustrated in FIG. 2. Cylinder 37 is receiving high pressure hydraulic fluid on the top of piston head 39, driving piston rod 41 to its maximum position of extension, thereby rotating crank shaft 43 about axis 44, as piston rod 41 is attached to crank shaft 43 via crank pin 45. This corresponds to the schematic condition of cylinder 17 in FIG. 1.

FIG. 3 also illustrates the condition of cylinder 18 in FIG. 1, where cylinder 38 has high pressure hydraulic fluid on the rod side of piston head 40, thereby moving piston rod 42 to its minimum position and thus rotating crank shaft 43 about axis 44 as piston rod 42 pulls on crank shaft 43 via crank pin 46. Piston 42 is about to reach its dwell or null point, shown by 2a in FIG. 2.

Figure 4:
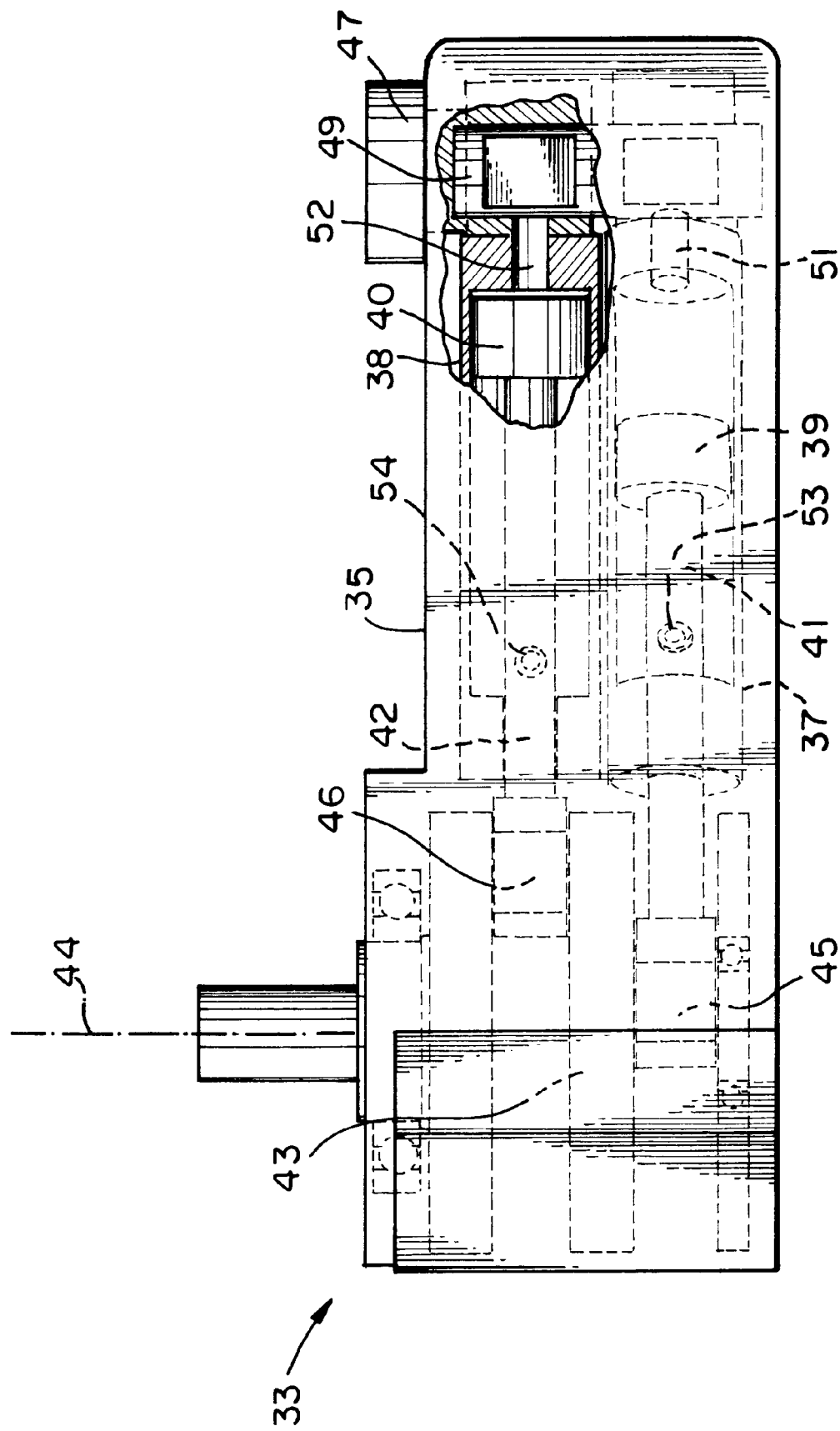
FIG. 4 is a plan view showing of the device shown in FIG. 3, again with some moving parts shown in dotted line.

FIG. 4 is a plan view of the device shown in FIG. 3, with the cylinders 37 and 38 in the same point of the motor cycle. FIG. 4 illustrates how hydraulic fluid under pressure is introduced into the cylinders via valve assembly 47. Valve assembly 47 provides for high pressure hydraulic fluid to flow along valve core 49, shown in the broken away portion, such that valve assembly 47 oscillates the same as cylinders 37 and 38 from maximum to minimum extension of rods 41 and 42. This travel is determined by the size of crank shaft 43 and the placement of points of attachment of rods 41, 42 via crank pins 45, 46 respectively.

Whatever the orientation of cylinders 37, 38, high pressure oil enters from valve assembly 47 along valve core 49 and communicates with one of two orifices in each cylinder 37 and 38, depending upon the specific location of the pistons. There is, of course, no flow when a piston is at dwell or null, as both orifices are closed during the transfer from one direction of force to the other, such as from push to pull on crank shaft 43. Cylinder 37 is extending or pushing piston rod 41 as high pressure hydraulic fluid pushes on piston head 39, flowing from valve assembly 47 along valve core 49 to first orifice 51. Low pressure hydraulic fluid is also being expelled from behind piston head 39 via second orifice 53 for return in accordance with the flow shown in FIG. 1. Cylinder 38 is retracting piston rod 42, thereby pulling crank shaft 43 via crank pin 46, as high pressure hydraulic fluid flows along core 49 to second orifice 54 as low pressure fluid is expelled via first orifice 52.

Figure 5A:
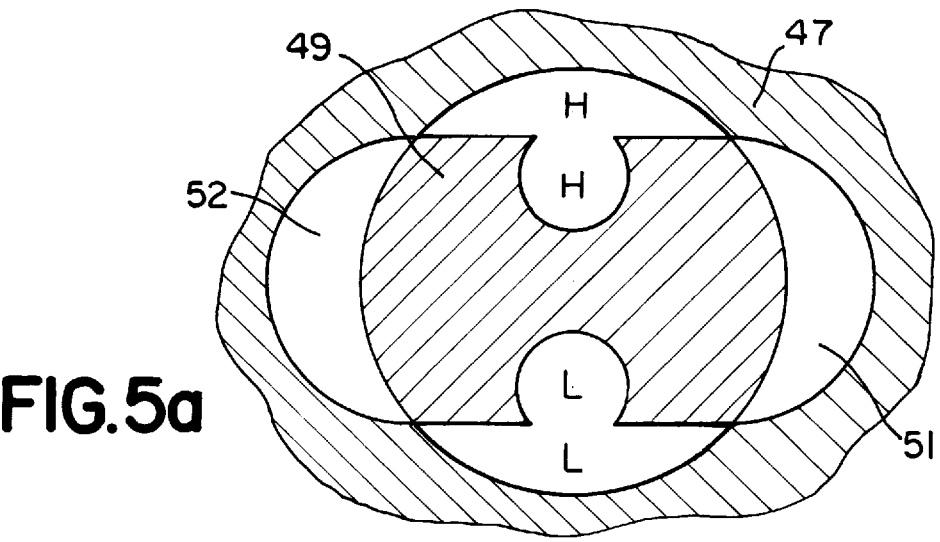
FIGS. 5a, 5b, and 5c is a schematic view of the valve operation of the device of FIGS. 3 and 4, showing high and low pressure fluid transfer.
Figure 5B:
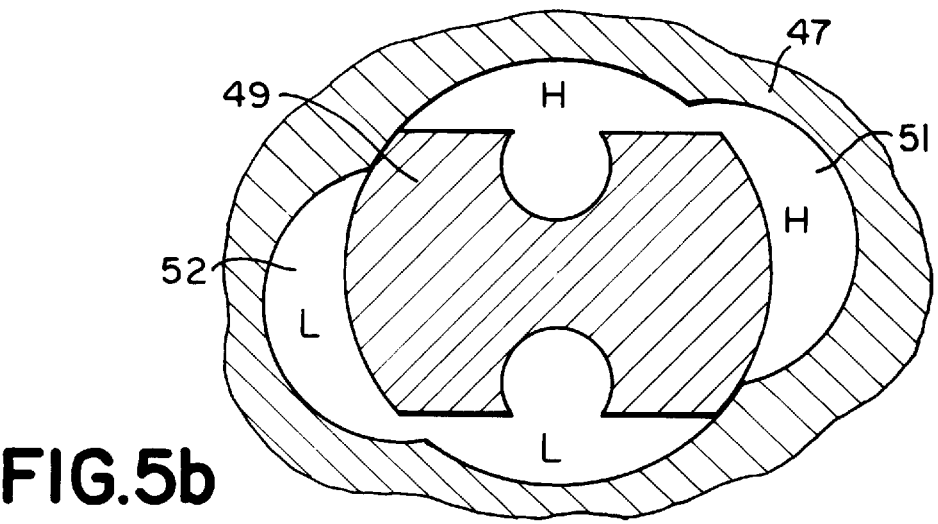
Figure 5C:
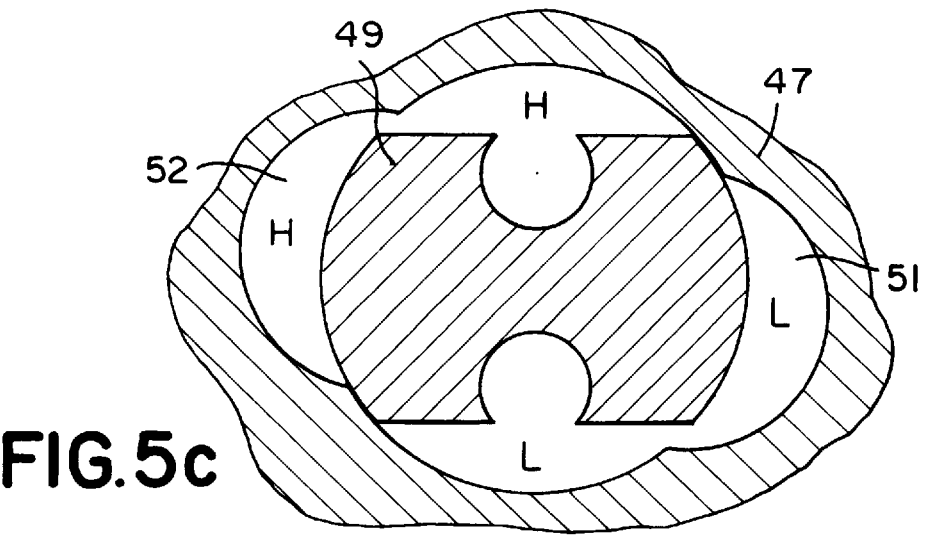

FIGS. 5a, 5b and 5c illustrates the flow of hydraulic fluid about valve core 49 as it moves in valve assembly 47 to transfer high pressure H to one orifice and low pressure L return fluid to the other orifice for each piston assembly. Valve assembly 47 moves with respect to valve core 49 as described above as piston heads 39 and 40 cycle between maximum and minimum positions as cylinders 37, 38 oscillate. In 5a, high pressure fluid H enters valve assembly 47 along core 49 and low pressure fluid L exits. As cylinder 37, for example, rotates, core 49 remains fixed with respect to oscillating assembly 47 in 5b to allow high pressure fluid H to enter orifice 51 and low pressure fluid L is removed from behind piston head 39 via orifice 53. Further travel past a dwell point (similar to 5a) shows in 5c high pressure fluid H entering orifice 53 and low pressure fluid L exiting orifice 51. A similar but reverse flow takes place in cylinder 38, offset by 90° for example, to provide at least one positive force at all times, as shown in FIG. 2.

Figure 6:
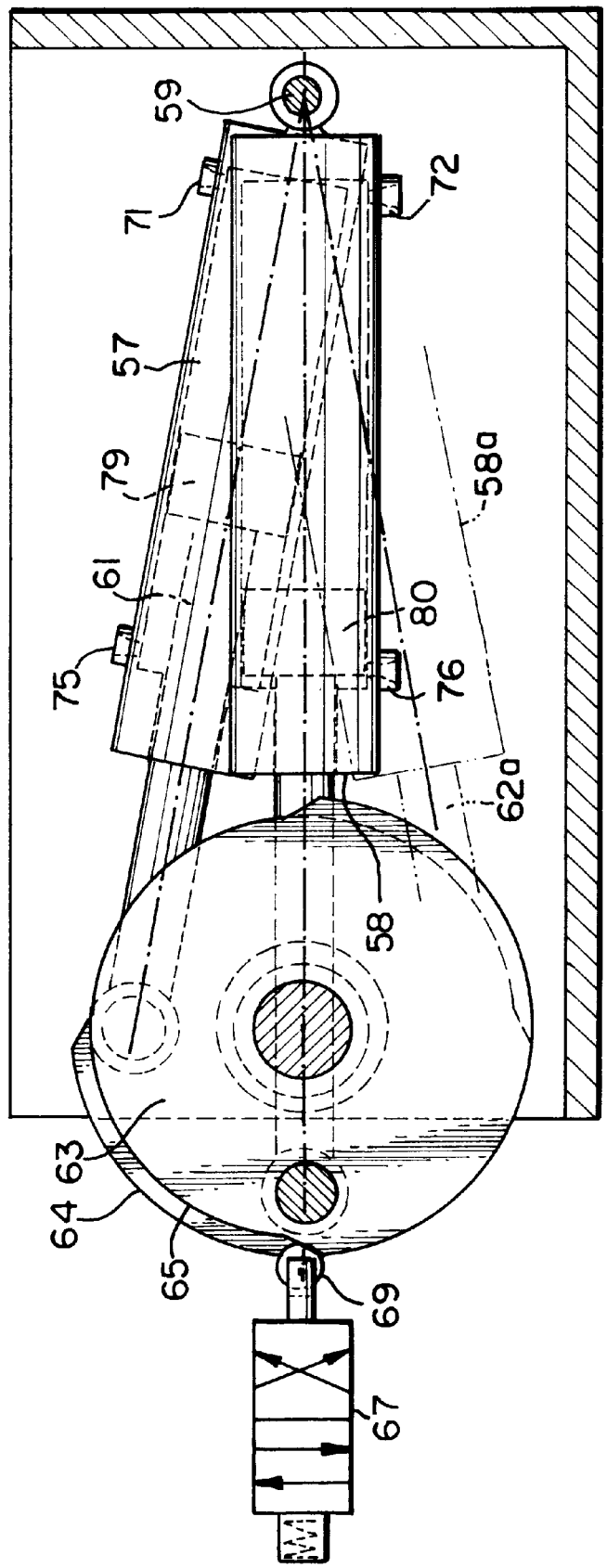
FIG. 6 is a side elevational view, partially in section along line 6—6 of FIG. 7, showing a second embodiment of the present invention, with some moving parts shown in dotted line.

In an alternative embodiment shown in FIGS. 6 and 7, hydraulic fluid flow is controlled at the opposite end from the device shown in FIGS. 4 and 5, yet the principle of operation is the same. Cylinder 57 oscillates about shaft 59 as piston rod 61 moves about crank shaft 63. Cylinder 58 also oscillates about shaft 59 as piston rod 62 also moves about crank shaft 63. For illustration purposes, one cylinder 58 is shown in the dwell location. It should be appreciated that there are only two cylinders in use. In this embodiment, crank shaft 63 includes an outer cam surface 64 and an inner surface 65, so that valves 67 engage these surfaces via spring biased roller 69. When roller 69 is on the inner surface 65, hydraulic fluid flows to port 71 to push piston head 79 and piston rod 61 toward crank shaft 63. Alternatively when roller 69 is on outer cam surface 64, hydraulic fluid flows to port 75 to move piston head 80 away from crank shaft 63 so that rod 61 pulls crank shaft 63 to cause further rotation thereof.

FIG. 7 illustrates the operation of this two piston embodiment of cylinders 57, 58 where first one and then the other piston moves its piston rod 61, 62 on the crank shaft 63 as fluid flows in or out of ports 71, 75 and 72, 76 respectively. In this embodiment as well as that of FIGS. 4 and 5, the two cylinders 57, 58 travel through the cycles illustrated in FIG. 2.

While springs and cams have replaced the valve assembly of FIGS. 4 and 5, operation is still based upon the unique and efficient principle of having hydraulic fluid act alternatively upon both faces of a piston in a cylinder, so that positive force is used to move the piston in both directions. An enormous amount of power is achieved when such motors are used as low speed/high torque hydraulic motors. A working model has been constructed that operates at 3500 psi and has a capability of generating up to 22,000 foot/pounds of torque or more.

The motors may be reversed on command, and have a braking function and may be locked solid by control of the fluid pressure flow, or they may move incrementally as desired. As set forth above, the motor functions also as a pump when energy is applied to the crank shaft. The housing that supports the motor should be solidly constructed to have high torsional rigidity. The unique push and pull action provides high torque, creating a large displacement motor in a compact package.

The device may be used to power a winch, or as a wheel motor for a garden tractor, a large tractor, a boat lift and storage vehicle, a crane or lift that can be placed on a truck bed or other vehicle, as a pump, and in many other industrial applications. This hydraulic motor is capable of functioning in most, if not all situations where conventional low speed/high torque hydraulic motors and the like are used, bringing the device of this invention's unique power and size advantages. While hydraulic fluids such as oil are preferred, the present invention will also function with other fluids such as water, compressible fluids such as inert gases, and the like. The shape of the motor of this invention lends itself to applications where the output of the shaft is at the end of a beam or column, such as in a lifting boom/beam. In one proposed design, the wheels are at the end of stork-like legs that extend down from a platform, such that the motor mechanism is within the leg rather than in the wheel. This provides for increased strength and reliability, among other advantages.

Turning now to FIGS. 8–11, the preferred embodiment is shown generally by the reference numeral 101. The winch device includes a motor 103, of the type described above, with crank shaft 105 (best seen in FIG. 9) driven hydraulically as described above. The device also includes a winch drum shaft 107 having a receiving socket 109 at one end thereof for optional engagement with a driver block 111 fixedly mounted on crank shaft 105. Winch drum 113 is mounted on winch drum shaft 107 and is able to rotate in either direction, shown by arrow 115 of FIG. 11, depending upon operation of motor 103, to add or remove cable 117 as shown in FIG. 10, for example.

In the preferred embodiment, the present invention is supported on a frame 119, which in turn may be mounted on a truck, such as on truck frame 121 as shown in FIGS. 10 and 11. A stationary end plate 123 is bolted on frame 119 and supports journal 125. Crank shaft 105 has an extension shaft 106 which extends from the crank shaft 105 through winch drum shaft 107. Extension shaft 106 turns when motor 103 rotates crank shaft 105, independently of winch drum shaft 107, and offers a power take-off 127 for other purposes. Winch drum shaft 107 fixedly supports winch drum 113 and is slideably mounted in journal 125 at one end and slideably mounted on extension shaft 106 at its other end, as best seen in FIG. 9 where the cut-away portion shows the inside of winch drum shaft 107 slideably resting on extension shaft 106. Of course, winch drum shaft 107 rests on extension shaft 106 as shown in FIG. 10 along their entire common length. Bearing assembly 126 provides permanent rotating support for shaft 107, while engagement of drive block 111 in receiving socket 109 supports shaft 107 as well as drives it via motor 103. The drum ends 129 and 130 of winch drum 113 function to keep cable 117 inside the drum 113.

As stated above, winch drum shaft 107 is slideably mounted in journal 125. Hydraulic fluid is used in the preferred embodiment to move drum shaft 107 into and out of engagement with motor 103, in the direction of arrow 131, by introduction of high pressure hydraulic fluid via inlet 133 or 135, as selected for movement toward or away from motor 103 for the attendant engagement and disengagement of drive block 111 in receiving socket 109, as previously described. Fluid entering inlet 133 forces hydraulic pressure into chamber 137, which moves drum shaft 107 away from motor 103, while fluid entering inlet 135, shown only on FIG. 11, forces hydraulic pressure into chamber 139 and causes receiving socket 109 to engage drive block 111. Inlets 133 and 135, of course, each permit fluid to be expelled under low pressure when high pressure fluid is applied to the other inlet. Cylinder 141 forms part of the hydraulic system as shown in FIG. 10.

The operation of a winch device requires the ability for 'free-wheeling' as well as being driven by a motor. When drum shaft 107 is moved away from motor 103, and drive block 111 no longer engages receiving socket 109, the drum is free to turn when force is applied to cable 117, for example. To stop the movement of drum 113, one can re-engage drive block 111 in receiving socket 109. Alternatively, the drum 113 and drum shaft 107 can be moved further away from motor 103, such as by increased pressure in chamber 137, to cause drum end 130 to engage brake pad 143, which is fixedly mounted on end plate 123 as shown in FIG. 10. This brake-on position, with drum end 130 engaging brake pad 143, stops or prevents free-wheeling of drum 113.

In summary, the present invention of a winch device operates using the motor of this invention to produce substantially improved results, using a constant displacement prime mover, no longer requiring a trade-off between pulling power and drum rotation speed. The cost per unit of motor size, such as cubic centimeters of cylinder size is less than half of that for prior art winches, primarily because of the simplicity of design of the motor.

While particular embodiments of the present invention have been illustrated and described, it is not intended to limit the invention, except as defined by the following claims.

What is claimed is:

1. A winch device, comprising:

a drum for storing cable;

hydraulically driven coupling means for disengageably coupling said drum to a winch drum shaft having an axis of rotation, said coupling means providing direct transmission-free drive of said drum shaft about said axis without gear engagement to thereby define first and second axial rotational positions when said drum is coupled to said winch drum shaft and a third free-wheeling position when said drum is uncoupled from said winch drum shaft;

a housing mounting a crank shaft having at least two throws, said crank shaft being operably connected to a drive shaft, said means for disengageably coupling said winch drum to a winch drum shaft including a driver block mounted on said crank shaft, a driver block receiving socket mounted on said winch drum shaft, and hydraulic coupling means for moving one of said crank and drum shafts into and out of engagement there between;

at least two cylinder and piston assemblies aligned in parallel planes and attached to said crank shaft at one end and to a common axis pivotal point at the other end thereof, each assembly being attached to a different crank shaft throw, for rotation of said crank shaft upon movement of said pistons between a minimum and maximum point of travel in said cylinders to thereby impart motion to said crank shaft, said at least two cylinders being located on the same side of said crank shaft in an offset alignment with respect to each other such that each piston reaches said minimum or maximum point of travel while the other is offset from said minimum or maximum points of travel, respectively;

valve means for providing hydraulic fluid to said cylinders and selectively to both faces of said pistons to impart movement thereof to sequentially move each said piston between said minimum and maximum points of travel by providing hydraulic fluid under pressure on said piston in both desired directions of piston travel while evacuating hydraulic fluid from the other side of said piston, said movement of said pistons in said cylinders causing oscillation of said cylinders about said pivotal point axis and in parallel planes to thereby actuate said valve means by said oscillation, said valve means comprising a valve assembly having a cylindrical, non-tapered valve core for transmitting hydraulic fluid within said assembly; first and second port means on each of said cylinders for introducing hydraulic fluid from said valve assembly selectively to both faces of said pistons to impart movement thereof; and first and second orifices in said valve assembly for each of said cylinders, said orifices being positioned to communicate with said port means selectively to direct flow from said valve core to and from said port means to thereby hydraulically impart torsional rotation of said winch drum shaft about said axis without mechanical speed reduction; and a source of hydraulic fluid under pressure connected to said valve means for supplying hydraulic fluid thereto under pressure and for receiving hydraulic fluid under said lesser pressure.

2. The device of claim 1, wherein said at least two cylinders are offset with respect to each other by about 90° of rotation of said crankshaft such that each piston reaches said minimum or maximum points of travel while the other is at a maximum point of mechanical advantage.

3. The device of claim 1, wherein said hydraulic fluid is oil.

4. The device of claim 1, which further includes brake means for preventing rotation of said winch drum shaft in said third free-wheeling position.

5. The device of claim 4, wherein said brake means includes fixed brake pads mounted proximate the end of said winch drum shaft opposite the end for engagement with said crank shaft.

* * * * *